United States Patent
Campbell et al.

[11] Patent Number: 5,864,807
[45] Date of Patent: Jan. 26, 1999

[54] METHOD AND APPARATUS FOR TRAINING A SPEAKER RECOGNITION SYSTEM

[75] Inventors: William Michael Campbell, Phoenix; Khaled Talal Assaleh, Tempe, both of Ariz.

[73] Assignee: Motorola, Inc., Schaumburg, Ill.

[21] Appl. No.: 805,540

[22] Filed: Feb. 25, 1997

[51] Int. Cl.[6] ...................................................... G01L 9/00
[52] U.S. Cl. ........................ 704/244; 704/245; 704/246
[58] Field of Search ..................................... 704/232, 231, 704/236, 243, 244, 245, 246, 247, 251; 395/22, 23, 24

[56] References Cited

U.S. PATENT DOCUMENTS

| | | | |
|---|---|---|---|
| 4,837,830 | 6/1989 | Wrench, Jr. et al. | 704/238 |
| 5,231,691 | 7/1993 | Yasuda | 704/200 |
| 5,390,136 | 2/1995 | Wang | 364/754 |
| 5,461,697 | 10/1995 | Nishimura et al. | 704/232 |
| 5,659,662 | 8/1997 | Wilcox et al. | 704/245 |

*Primary Examiner*—David R. Hudspeth
*Assistant Examiner*—Susan Wieland
*Attorney, Agent, or Firm*—Frank J. Bogacz

[57] ABSTRACT

A method and apparatus for training a system to assess the identity of a person through the audio characteristics of their voice. The system inserts an audio input (10) into an A/D Converter (20) for processing in a digital signal processor (30). The system then applies Neural network type processing by using a polynomial pattern classifier (60) for training the speaker recognition system.

29 Claims, 1 Drawing Sheet

METHOD AND APPARATUS FOR TRAINING A SPEAKER RECOGNITION SYSTEM

BACKGROUND OF THE INVENTION

The present invention pertains to speaker recognition system and more particularly to discriminative speaker recognition systems.

Modern methods in digital signal and speech processing have made it possible to assess identity of an individual through audio characteristics of individuals voices. This speaker recognition process makes possible the recognition of each individual from the voice of the person speaking. The end result is the capability to identify the person with a unique identifier or name of the individual.

A typical system for speaker recognition extracts audio features from speech. It then applies a pattern classifier to the features to perform the recognition. The pattern recognition system is either unsupervised or supervised (discriminative).

Previous state of the art methods for discriminative recognition training required large amounts of data transferring and computation for classifying a speaker.

Unsupervised classifiers model the features of an individual person or speaker without reference to features of others. Discriminative pattern classifiers, in contrast, are trained to discriminate between different speakers.

In general, supervised classifiers are more accurate than unsupervised classifiers because they focus on many specific differences between various speakers.

A drawback of supervised classifiers is that they traditionally require large amounts of computation capability to adequately train the processor to recognize a speaker.

Accordingly, it is advantageous to have a means of implementing discriminative speaker recognition that is less complex and less costly than previous methods.

DESCRIPTION OF THE PREFERRED EMBODIMENT

In accordance with the present invention, a novel method and apparatus for training, reinforcement, and retraining of a speaker recognition system is shown.

The basic system accepts an audio input from a person' speech. An analog to digital (A/D) converter then converts the audio input to a digital form. Next, a digital signal processor (DSP) processes the digitized audio signal.

This digitized audio signal becomes a differentiating factor that describes the person speaking. This information is then stored and processed for training a pattern recognition system. Computation for retraining is reduced dramatically over previous speaker recognition methods.

Storage is also significantly reduced since the original speech data does not need to be stored. The novel classifier structure also reduces the storage requirements. Previous state of the art methods require large amounts of data transferring and computation for retraining. The present invention reduces data handling so it can be readily performed over a data link, if desired.

Figure 1:
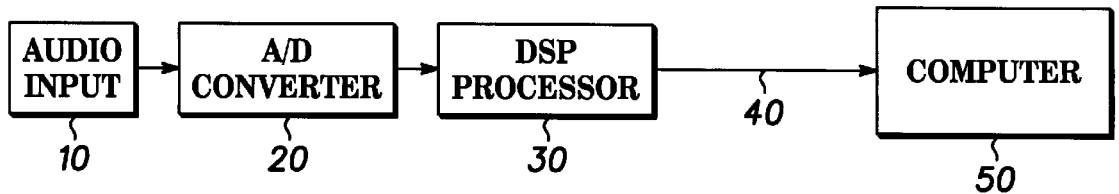
FIG. 1 is a block diagram depicting a speaker recognition training system.

Referring to FIG. 1, a block diagram is shown of a system to implement the training process for a speaker recognition system. In this configuration, an audio input 10 is entered into the speech system. This could be from a recorded medium or a communication system. The system starts by converting the audio signal into a digital format through an analog-to-digital (A/D) converter 20 to produce a digitized audio signal.

The digital signal processor (DSP) 30 then processes the digitized audio signal. DSP 30 produces a differentiating factor (r) describing the speaker voice input.

This set of differentiating factors (r) is then processed directly by computer 50 or by sending a set of differentiating factors (r) to a database computer 50, by a data link 40, if desired.

The differentiating factor (r) is stored and processed in the computer 50. This becomes a digital audio signature (w) that describes the person speaking. The first digital audio signature (w) is then stored and processed for training in a pattern recognition system.

Figure 2:
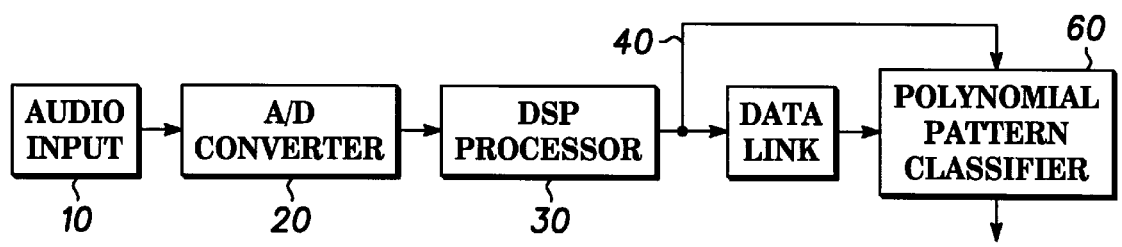
FIG. 2 is a block diagram depicting the polynomial pattern classifier used in the computer to discriminate between speakers in accordance with the present invention.
Figure 3:
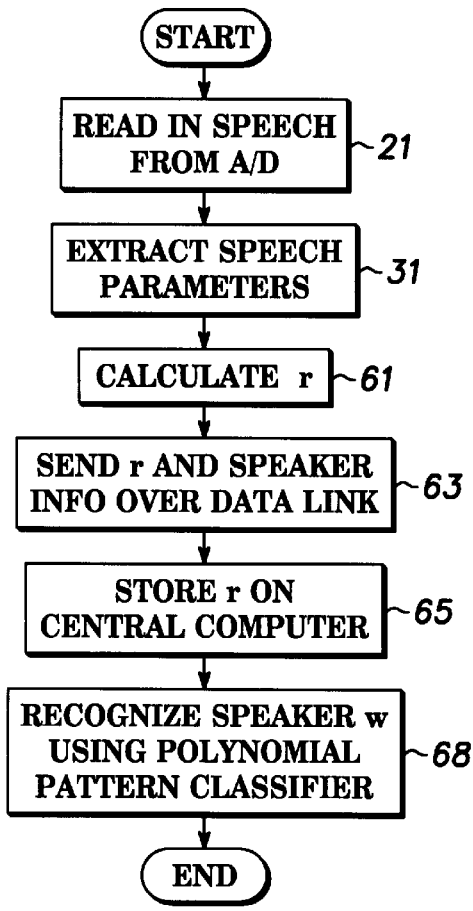
FIG. 3 is a flowchart for adding an additional speaker to the database in accordance with the present invention.
Figure 4:
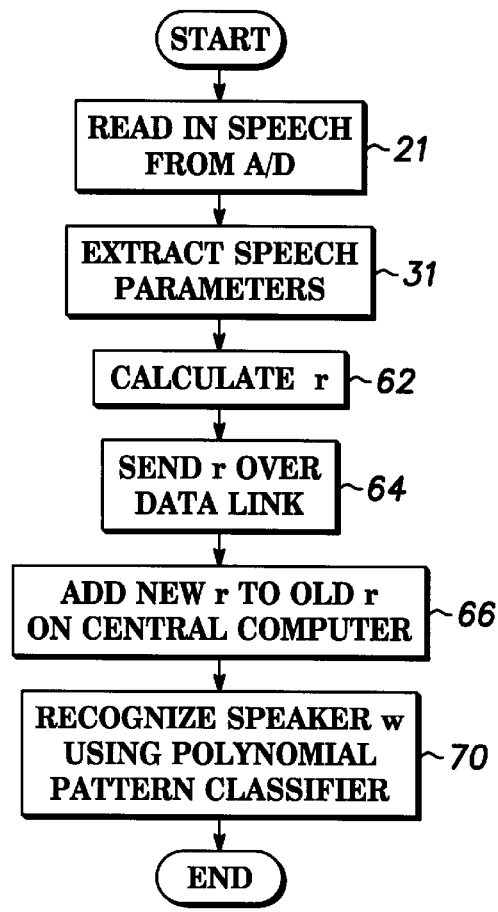
FIG. 4 is a flowchart for reinforcing the model for a particular person for training in accordance with the present invention for a speaker recognition system.

In order to understand the speaker recognition process, refer to the FIG. 2 block diagram. FIG. 2 illustrates the incorporation of the polynomial pattern classification system 60, which includes software resident in computer 50. FIG. 3 illustrates the flow chart for the data as it flows through the block diagram hardware of the present invention. FIG. 4 shows the parallel flowchart for retraining or reinforcement of a speaker in the data base.

Computation for retraining is reduced dramatically over previous recognition methods. Storage is significantly reduced since the original speech data does not need to be stored. The classifier structure also reduces the storage requirements.

The converted input audio speech 10 is read in from the A/D converter 20 and are block 21. The converted input audio signal is processed by the DSP 30 and the speech parameters are block 31. The data rate of the sampled speech is usually around 128 kbits / sec. The sampling rate is usually around an 8 kHz rate and 16 bit data.

The DSP 30 is extracting audio spectral features that are used to derive the speaker model used in the polynomial classifier. The speaker model is referred to as the audio print or voice signature. The basic features being used are the frequency domain representation of the short-time power spectra of the speech, termed cepstra and the transitional or dynamic information of the cepstra, termed the delta-cepstra.

Alternate similar spectral features can also be used that have similar performance. These include linear-predictive coefficients, or LPC, and non-linearly processed filter bank outputs termed mel-frequency cepstra coefficients (MFCC) known to those skilled in the art.. The DSP is used to produce a sequence of feature vectors denoted as $X^1$, $X^2$, ..., $X^M$ using some speech recognition representation.

These are the audio features used by the polynomial classifier 60 in the pattern recognition system. An example of a polynomial classifier can be found in the U.S. Pat. No. 5,390,136: "Artificial Neuron and Method of Using Same".

Each feature vector, $X^i$, is expanded in the well known set of polynomial basis terms up to a maximum order of K. For this application, the standard canonical basis of polynomials for variables $X_1, X_2, \ldots, X_N$ is used; the constant $1$; the first order terms $X_1, X_2, \ldots, X_N$; the second order terms $X_1 X_2$, $X_1 X_3, \ldots, X_N X_N$; the third order terms, etc., up to the order $K$.

The vector of polynomial basis terms for a given vector can be denoted X by $p(X)$ or $p(X)=[1\ X_1\ X_2\ X_N X_1\ X_2 \ldots ]$. In order to discriminate between inputs form different speakers, the polynomial classifier must be trained. First, only two speakers will be classified. A first speaker can be specified as having features $X^1, X^2, \ldots, X^M$ and a second speaker, as having features $Y^1, Y^2, \ldots, Y^M$.

To discriminate between each of the two speakers, a classifier is trained for each speaker. For the first speaker, polynomial fitting or training can be done in the 2-norm to an ideal output of 1 for the features of the first speaker and an ideal output of 0 for the second speaker. This can be represented in matrix form.

First define $M_i$ to be the matrix whose rows are the polynomial expansions of speaker i's features; i.e., $$M_1 = \begin{bmatrix} p(x^1) \\ \cdot \\ \cdot \\ \cdot \\ p(x^M) \end{bmatrix}, M_2 = \begin{bmatrix} p(y^1) \\ \cdot \\ \cdot \\ \cdot \\ p(y^M) \end{bmatrix}, M = \begin{bmatrix} M_1 \\ M_2 \end{bmatrix}.$$

Also, let $$M = \begin{bmatrix} M_1 \\ M_2 \end{bmatrix},$$

and let $o_1$ be the column vector of length 2M whose first M entries are 1 and remaining entries are 0, and $o_2=1-o_1$. The resulting training problems for the first and second speaker are respectively $$\min_{w_1} \|Mw_1 - o_1\|_2 \quad \text{Equation 1}$$

$$\min_{w_2} \|Mw_2 - o_2\|_2.$$

First a basic method of solving the equations above will be presented. By solving the equation for a speaker the digital audio signature (r) for that speaker is produced.

This method involves improvement in storage and computation because of the unique structure of the polynomial classifier. Next the solution of the equations in the framework of training over a data link is presented.

First consider only the training for speaker 1. To solve Equation 1, the method of normal equations can be used. Suppose that the rows in M corresponding to the speaker 1's and speaker 2's data are denoted as $M_1$ and $M_2$ respectively.

Then using the method of normal equations:

$$M^t M w_1 = M^t o_1$$

$$(M_1^t M_1 + M_2^t M_2) w_1 = M_1^t 1 \quad \text{Equation 2}$$

$$(R_1 + R_2) w_1 = M_1^t 1$$

where 1 is a vector of all ones.

Equation 2 shows the basic idea of training, which could be directly coupled to a processor or over a data link. The matrix $R_i$ relies only upon data from speaker i and can be computed from the input speech data; further this matrix needs to be computed only once per speaker.

After the matrix is computed, it can be stored for future retraining. Finally, it is noted that $M_i^t 1$ can be obtained from the entries of $R_1$; we let $a_i = M_i^t 1$.

Next consider the compression and computation of the $R_i$ matrix. Because the rows of $M_i$ are polynomial basis terms, significant structure exists in the $R_i$ matrix.

The distinct terms of the matrix $R_i$ are exactly the sums of polynomial basis terms of order less or equal to 2K. This property can be seen by noting that $$M_i^t M_i = \sum_{i=1}^{N} p(x_i)^t p(x_i).$$

The number of entries in the matrix $R_i$ is significantly greater than the number of polynomial terms of order less than or equal to 2K. Significant compression therefore results from storing only the polynomial terms. A mapping between the polynomial terms and the matrix can be found using ordering relations. Next, denote the sum of the vector of polynomial terms for each speaker, $r_i$; and denote the vector polynomial terms of order 2K for a feature vector x by $p_2(x)$.

Referring to FIG. 3, block 21 reads in the speech parameters from the analog to digital converter. Block 31 extracts the speech parameters from the input speech. The calculate r step stores only the polynomial terms, block 61. The polynomial terms may be sent over a data link, block 63. The polynomial terms may also be stored on a central computer, block 65. Block 68 then finds the speaker recognition using the polynomial classifier. This is called the digital audio signature (w). Thus FIG. 3 has shown the novel flowchart for addition of a speaker to the speaker database in accordance with the present invention.

The novel training/retraining method for the database follows: First set R=0. For i=1 to the <number of speakers>, map $r_i$ to $R_i$ and R=R+Ri. Find the Cholesky decomposition of $R=L^t L$. For i=1 to the <number of speakers>, solve $L^t L w_{i=ai}$ using back substitution. Note that the matrix R does not have to be computed every time a retraining or enrollment occurs if all speakers in the database are included in the training.

Referring to FIG. 4, the calculate r steps stores the polynomial terms, block 62. The polynomial terms may be sent over a data link, block 64. The polynomial terms may also be stored on a central computer, block 66. Means for adding a new set of differentiating factors is included. Block 70 then finds the speaker recognition using the classifier. The comparison with a stored signature results in recognition for permitting access to the speaker.

FIG. 4 has shown the flowchart for extracting, iterating and adding speech parameters for reinforcement of a speaker in the database in accordance with the present invention using well known matrix methods. The improvement in this invention over the prior technology includes three main areas of the art: computation, storage, and scalability.

Computation for retraining has been reduced dramatically over previous methods. In addition, training is now structured with the current invention such that it can also be performed over a data link. The prior art had the drawback that retraining and reinforcement times were computationally complex.

Retraining is performed every time a new individual is introduced into the speaker verification system. The present invention has a specific apparatus, storage method, and computation method to reduce retraining so that it can be performed with extremely low complexity. For example, training and retraining can be performed on a laptop computer.

In addition to the retraining feature, the system has the advantage that it is not traditional artificial neural network technology, but a technology that is usually used in an "unsupervised" mode. The present invention classifier is "supervised" which means that the training takes advantage of any impostors to improve speaker recognition performance.

Previous state of the art methods such as recursive least squares (RLS) or the pseudo-inverse method require large amounts of computation and data transfer for retraining. Storage has been reduced dramatically by the present invention over previous art since the original audio data does not need to be stored.

Further reductions in storage were achieved because of the structure of the classifier. Finally, the system is readily scaleable by those skilled in the art. Because of efficient management of computation and storage, the present invention can be used with large numbers of speakers. This can be used to deny or permit communication access by a speaker by recognition of their differentiating factors. The present invention will reduce the cost, computing capability and storage required to implement speaker audio recognition systems.

Although the current preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for training a speaker recognition system by a computer, comprising steps of:

extracting speech parameters from a digitized audio signal to produce a set of differentiating factors (r);

storing said set of differentiating factors (r) in a data base to produce a stored set of differentiating factors (r);

polynomial pattern classifying by the computer said stored set of differentiating factors (r) to produce a first digital audio signature (w);

storing said first digital audio signature (w) in said data base to produce a stored first digital audio signature (w);

specifying a first speaker as having audio signature features $X^1, X^2, \ldots, X^M$;

specifying a second speaker, as having audio signature features $Y^1, Y^2, \ldots, Y^M$;

discriminating between said first speaker and said second speaker;

training for said first digital audio signature (w) features of said first speaker, a polynomial for a 2-norm to an ideal output of said first speaker, and an ideal output of 0 for said second speaker;

representing a matrix whose rows are a polynomial expansions of said first and second sneakers audio signature features, $$M_1 = \begin{bmatrix} p(X^1) \\ \cdot \\ \cdot \\ \cdot \\ p(X^M) \end{bmatrix}, M_2 = \begin{bmatrix} p(y^1) \\ \cdot \\ \cdot \\ \cdot \\ p(y^M) \end{bmatrix}, M = \begin{bmatrix} M_1 \\ M_2 \end{bmatrix}$$

-continued where $$M = \begin{bmatrix} M_1 \\ M_2 \end{bmatrix}$$

and where $o_1$ is a column vector of length 2M whose first M entries are 1 and remaining entries are 0, and $o_2 = 1 - o_1$ and training for said first speaker and said second speaker respectively being:

$$\min_{w_1} \|Mw_1 - o_1\|_2$$

$$\min_{w_2} \|Mw_2 - o_2\|_2.$$

2. A method for training a speaker recognition system by said computer as claimed in claim 1, wherein the there is further included a step of providing an audio input of a voice of a speaker from a recorded medium.

3. A method for training a speaker recognition system by said computer as claimed in claim 1, wherein there is further included a step of converting an audio input to said digitized audio signal.

4. A method for training a speaker recognition system by said computer as claimed in claim 1, wherein there is further included a step of sending said set of differentiating factors (r) to said data base by a data link.

5. A method for training a speaker recognition system by said computer as claimed in claim 1, wherein the step of extracting speech parameters includes a step of determining a frequency domain representation of a short-time power spectra and cepstra of said digitized audio signal.

6. A method for training a speaker recognition system by said computer as claimed in claim 1, wherein the step of extracting speech parameters includes a step of determining a frequency domain representation of transitional information (dynamic) short-time power spectra and delta-cepstra of said digitized audio signal.

7. A method for training a speaker recognition system by said computer as claimed in claim 1, wherein the step of extracting speech parameters includes a step of determining non-linearly processed filter bank output of said digitized audio signal.

8. A method for training a speaker recognition system by said computer as claimed in claim 1, wherein the step of extracting speech parameters includes a step of determining linear-predictive coefficients of the digitized audio signal.

9. A method for training a speaker recognition system by said computer as claimed in claim 1, wherein the step of extracting speech parameters resulting in said set of differentiating factors (r) includes a step of adding a new set of said differentiating factors (r) to a stored set of differentiating factors (r).

10. A method for training a speaker recognition system by said computer as claimed in claim 1, wherein there is further included the step of extracting, storing said set of differentiating factors (r), and polynomial pattern classifying by the computer for a second digitized audio signal to produce a second digital audio signature (w).

11. A method for training a speaker recognition system by said computer as claimed in claim 1, wherein there is further included the step of comparing said first and second digital audio signatures (w) to recognize a speaker.

12. A method for training a speaker recognition system by said computer as claimed in claim 1, wherein there is further included the step of permitting communication access by the speaker if first and second digital audio signature (w) correlate.

13. A method for training a speaker recognition system by said computer as claimed in claim 1, wherein there is further included the step of training said first digital audio signature (w) with said second digital audio signature (w).

14. A method for training a speaker recognition system by said computer as claimed in claim 1, wherein there is further included the step of storing said second digital audio signature (w) in the data base.

15. A method for training a speaker recognition system by said computer as claimed in claim 1, wherein there is further included the step of training with said differentiating factors (r), where rows in M correspond to the said first speaker and said speaker audio signature are denoted as $M_1$ and $M_2$ respectively:

$$M^t M w_1 = M^t o_1$$

$$(M_1^t M_1 + M_2^t M_2) w_1 = M_1^t 1$$

$$(R_1 + R_2) w_1 = M_1^t 1$$

where 1 is a vector of all ones.

16. An apparatus for training a speaker recognition system comprising:

a processor for extracting speech parameters from a digitized audio signal to produce a set of differentiating factors (r);

a computer for storing said set of differentiating factors (r) in a data base, said computer coupled to said processor;

a polynomial pattern classifier operating on said set of differentiating factors (r) to produce a first digital audio signature (w);

means for storing said digitized audio signature (w) in said data base to produce a stored first digital audio signature (w);

means for specifying a first speaker as having audio signature features $X^1, X^2, \ldots, X^M$;

means for specifying a second speaker, as having audio signature features $Y^1, X^2, \ldots, Y^M$;

means for discriminating between said first speaker and said second speaker;

means for training said audio signature of said first and second speaker to provide a polynomial for a 2-norm to an ideal output of 1 for features of said first speaker and an ideal output of 0 for said second speaker;

means for representing a matrix whose rows are a polynomial expansions of said first and second speakers audio signature features, $$M_1 = \begin{bmatrix} p(X^1) \\ \cdot \\ \cdot \\ \cdot \\ p(X^M) \end{bmatrix}, M_2 = \begin{bmatrix} p(y^1) \\ \cdot \\ \cdot \\ \cdot \\ p(y^M) \end{bmatrix}, M = \begin{bmatrix} M_1 \\ M_2 \end{bmatrix}$$

where $$M = \begin{bmatrix} M_1 \\ M_2 \end{bmatrix}$$

and where $o_1$ is a column vector of length 2M whose first M entries are 1 and remaining entries are 0, and $o_2 = 1 - o_1$; and said means for training of said first speaker and said second speaker respectively being:

$$\min_{w_1} \|M w_1 - o_1\|_2$$

$$\min_{w_2} \|M w_2 - o_2\|_2.$$

17. The apparatus as claimed in claim 16, wherein said polynomial pattern classifier includes means for training with said differentiating factors (r) where rows in M corresponding to said first speaker and said second speaker audio signature are denoted as $M_1$ and $M_2$ respectively:

$$M^t M w_1 = M^t o_1$$

$$(M_1^t M_1 + M_2^t M_2) w_1 = M_1^t 1$$

$$(R_1 + R_2) w_1 = M_1^t 1$$

where 1 is a vector of all ones.

18. The apparatus as claimed in claim 16, wherein there is further included a source of an audio input.

19. The apparatus as claimed in claim 18, wherein there is further included an analog/digital converter for producing said digitized audio signal from said audio input, said analog/digital converter coupled to said source and to said processor.

20. The apparatus as claimed in claim 16, wherein there is further included a data link for sending said set of differentiating factors (r) to said data base, said data link coupled to said processor and to said computer.

21. The apparatus as claimed in claim 16, wherein said processor further includes means for determining a frequency domain representation of a short-time power spectra or cepstra of said digitized audio signal, said means for determining operated by said computer.

22. The apparatus as claimed in claim 16, wherein said processor further includes means for determining a frequency domain representation of a transitional information (dynamic) short-time power spectra or delta-cepstra of said digitized audio signal.

23. The apparatus as claimed in claim 16, wherein said processor further includes means for determining non-linearly processed filter bank outputs of said digitized audio signal.

24. The apparatus as claimed in claim 16, wherein said processor further includes means for determining linear-predictive coefficients of the digitized audio signal.

25. The apparatus as claimed in claim 16, wherein said processor includes means for extracting speech parameters resulting in said set of differentiating factors (r).

26. The apparatus as claimed in claim 16, wherein said polynomial pattern classifier includes means for comparing speech parameters in said set of differentiating factors (r).

27. The apparatus as claimed in claim 16, wherein said polynomial pattern classifier includes means for recognizing speech parameters of a person in said set of differentiating factors (r).

28. The apparatus as claimed in claim 16, wherein said polynomial pattern classifier includes means for adding a new set of said differentiating factors (r) to a set of differentiating factors (r) already in a data base to train said speaker recognition system.

29. The apparatus as claimed in claim 16, wherein said polynomial pattern classifier includes means for adding a new set of said differentiating factors (r) to update said set of differentiating factors (r) in a data base to retrain said speaker recognition system.

* * * * *